US006649670B1

(12) United States Patent
Harris et al.

(10) Patent No.: US 6,649,670 B1
(45) Date of Patent: Nov. 18, 2003

(54) CONTINUOUS NEAT POLYMERIZATION AND AMBIENT GRINDING METHODS OF POLYOLEFIN DRAG REDUCING AGENTS

(75) Inventors: Jeffery R. Harris, Tulsa, OK (US); John F. Motier, Broken Arrow, OK (US); Mike Callaway, Sapulpa, OK (US); George G. Ramsay, Sand Springs, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/321,762

(22) Filed: Dec. 17, 2002

(51) Int. Cl.$^7$ .................................................. C08K 5/01
(52) U.S. Cl. ........................ 523/175; 524/476; 524/570; 526/88; 528/502 R; 137/13
(58) Field of Search ........................ 526/88; 528/502 R; 523/175; 524/476, 570; 137/13

(56) References Cited

U.S. PATENT DOCUMENTS

| | | |
|---|---|---|
| 2,879,173 A | 3/1959 | Yacoe |
| 3,351,601 A | 11/1967 | Blaga et al. |
| 3,528,841 A | 9/1970 | Donaldson et al. |
| 3,632,369 A | 1/1972 | Hahn |
| 3,779,969 A * | 12/1973 | Clayton et al. ............. 523/175 |
| RE28,361 E | 3/1975 | Hahn |
| 3,884,252 A | 5/1975 | Kruka |
| 4,016,894 A | 4/1977 | Baldwin et al. |
| 4,066,539 A | 1/1978 | Hachisu et al. |
| 4,147,677 A | 4/1979 | Lundberg et al. |
| 4,177,177 A | 12/1979 | Vanderhoff et al. |
| 4,212,312 A | 7/1980 | Titus |
| 4,263,926 A | 4/1981 | Drake et al. |
| 4,289,679 A | 9/1981 | Mack |
| 4,340,076 A | 7/1982 | Weitzen |
| 4,384,089 A | 5/1983 | Dehm |
| 4,436,846 A * | 3/1984 | Krantz ........................ 523/175 |
| 4,499,214 A | 2/1985 | Sortwell |
| 4,510,304 A | 4/1985 | Hadermann |
| 4,527,581 A | 7/1985 | Motier |
| 4,584,244 A | 4/1986 | Fenton |
| 4,588,640 A | 5/1986 | Matlach |
| 4,659,334 A | 4/1987 | Matlach |
| 4,693,321 A | 9/1987 | Royer |
| 4,720,397 A | 1/1988 | O'Mara et al. |
| 4,771,799 A | 9/1988 | Baxter et al. |
| 4,789,383 A | 12/1988 | O'Mara et al. |
| 4,826,728 A | 5/1989 | O'Mara et al. |
| 4,837,249 A | 6/1989 | O'Mara et al. |
| 5,080,121 A | 1/1992 | Malik et al. |
| 5,165,440 A | 11/1992 | Johnston |
| 5,165,441 A | 11/1992 | Mitchell |
| 5,169,074 A | 12/1992 | Fauth et al. |
| 5,244,937 A | 9/1993 | Lee et al. |
| 5,376,697 A | 12/1994 | Johnston et al. |
| 5,449,732 A | 9/1995 | Smith et al. |
| 5,504,131 A | 4/1996 | Smith et al. |
| 5,504,132 A | 4/1996 | Smith et al. |
| 5,539,044 A | 7/1996 | Dindi et al. |
| 5,733,953 A * | 3/1998 | Fairchild et al. ............ 523/336 |
| 6,172,151 B1 | 1/2001 | Johnston et al. |
| 6,399,676 B1 | 6/2002 | Labude et al. |
| 2002/0065352 A1 | 5/2002 | Johnston et al. |

FOREIGN PATENT DOCUMENTS

| | | |
|---|---|---|
| CA | 675522 | 12/1963 |
| CA | 901727 | 5/1972 |
| EP | 0 196 350 B1 | 10/1986 |
| GB | 1452146 | 10/1976 |
| WO | WO 01/88031 A1 | 11/2001 |
| WO | WO 02/101282 A2 | 12/2002 |

OTHER PUBLICATIONS

C. B. Lester, "What to Expect From and How to Handle Commercially Available Drag–Reducing Agents," Oil & Gas Journal, Mar. 11, 1985, pp. 116–119.
NERAC Abstract of WO 02/085960, 2002.
NERAC Abstract of WO 02/085960, 2002.
NERAC Abstract of EP 887265 B1, 2002.
NERAC Abstract of US 4,557,713, 2002.
NERAC Abstract of WO 02/102667, 2002.
NERAC Abstract of WO 02/102663, 2002.

* cited by examiner

*Primary Examiner*—Fred Teskin
(74) *Attorney, Agent, or Firm*—Madan, Mossman & Sriram, P.C.

(57) ABSTRACT

A process for continuously producing a polymer drag reducing agent (DRA) is described. The process concerns mixing a monomer and a catalyst in at least one continuously stirred tank reactor (CSTR) to form a mixture. The mixture is continuously injected into a volume continuously formed by a thermoplastic material, such as polyethylene. The thermoplastic material is periodically sealed off to form a temporary container or bag. The monomer is permitted to polymerize in the temporary container to form polymer. In one non-limiting embodiment, the polymerization in the bag takes place within an inert, circulating fluid that accelerates heat transfer. The polymer and the temporary container are then ground together, preferably at non-cryogenic temperatures, to produce a particulate polymer drag reducing agent. In one preferred, non-limiting embodiment, the grinding or pulverizing occurs in the presence of at least one solid organic grinding aid. Finally, the particulate polymer drag reducing agent may be combined with a dispersing fluid.

45 Claims, No Drawings

US 6,649,670 B1

CONTINUOUS NEAT POLYMERIZATION AND AMBIENT GRINDING METHODS OF POLYOLEFIN DRAG REDUCING AGENTS

FIELD OF THE INVENTION

The invention relates to processes for producing polymeric drag reducing agents, and most particularly to processes for continuously producing polymeric drag reducing agents in a finely divided particulate form at high conversions.

BACKGROUND OF THE INVENTION

The use of polyalpha-olefins or copolymers thereof to reduce the drag of a hydrocarbon flowing through a conduit, and hence the energy requirements for such fluid hydrocarbon transportation, is well known. These drag reducing agents or DRAs have taken various forms in the past, including slurries or dispersions of ground polymers to form free-flowing and pumpable mixtures in liquid media. A problem generally experienced with simply grinding the polyalpha-olefins (PAOs) is that the particles will "cold flow" or stick together after the passage of time, thus making it impossible to place the PAO in the hydrocarbon where drag is to be reduced, in a form of suitable surface area, and thus particle size, that will dissolve or otherwise mix with the hydrocarbon in an efficient manner. Further, the grinding process or mechanical work employed in size reduction tends to degrade the polymer, thereby reducing the drag reduction efficiency of the polymer.

One common solution to preventing cold flow is to coat the ground polymer particles with an anti-agglomerating or partitioning agent. Cryogenic grinding of the polymers to produce the particles prior to or simultaneously with coating with an anti-agglomerating agent has also been used. However, some powdered or particulate. DRA slurries require special equipment for preparation, storage and injection into a conduit to ensure that the DRA is completely dissolved in the hydrocarbon stream. The formulation science that provides a dispersion of suitable stability such that it will remain in a pumpable form necessitates this special equipment.

Gel or solution DRAs (those polymers essentially being in a viscous solution with hydrocarbon solvent) have also been tried in the past. However, these drag reducing gels also demand specialized injection equipment, as well as pressurized delivery systems. The gels or the solution DRAs are stable and have a defined set of conditions that have to be met by mechanical equipment to pump them, including, but not necessarily limited to viscosity, vapor pressure, undesirable degradation due to shear, etc. The gel or solution DRAs are also limited to about 10% polymer as a maximum concentration in a carrier fluid due to the high solution viscosity of these DRAs. Thus, transportation costs of present DRAs are considerable, since up to about 90% of the volume being transported and handled is inert material.

U.S. Pat. No. 2,879,173 describes a process for preparing free-flowing pellets of polychloroprene involving suspending drops of an aqueous dispersion of the polychloroprene in a volatile, water-immiscible organic liquid in which the polymer is insoluble at temperatures below −20° C. until the drops are completely frozen and the polychloroprene coagulated, separating the frozen pellets from the suspending liquid, coating them while still frozen with from 5% to 20% of their dry weight of a powder which does not react with the polychloroprene under normal atmospheric conditions, and removing the water and any adhering organic liquid through vaporization by warming the pellets.

A method for coating pellets of a normally sticky thermoplastic binder material by using a mixture of a minor proportion of a vinyl chloride/vinyl acetate copolymer and a major proportion of a chlorinated paraffin wax with powdered limestone or talc powder is described in U.S. Pat. No. 3,351,601.

U.S. Pat. No. 3,528,841 describes the use of microfine polyolefin powders as parting agents to reduce the tackiness of polymer pellets, particularly vinyl acetate polymers and vinyl acetate copolymers.

Similarly, Canadian patent 675,522 involves a process of comminuting elastomeric material for the production of small particles that includes presenting a large piece of elastomeric material to a comminuting device, feeding powdered resinous polyolefin into the device, comminuting the elastomeric material in the presence of the powdered polyolefin and recovering substantially free-flowing comminuted elastomeric material.

A process for reducing oxidative degradation and cold flow of polymer crumb by immersing the crumb in a non-solvent such as water and/or dusting the. crumb with a powder such as calcium carbonate and 2,6-di-t-butylparacresol, 4,4'-methylene-bis-(2,6-di-t-butylphenol) or other antioxidants is discussed in U.S. Pat. No. 3,884,252. The patent also mentions a process for reducing fluid flow friction loss in pipeline transmission of a hydrocarbon fluid by providing a continuous source of the dissolved polymer.

U.S. Pat. No. 4,016,894 discloses that drag in turbulent aqueous streams is reduced by a powder composition of a finely divided hygroscopic drag reducing powder, for example poly(ethylene-oxide), and a colloidal size hydrophobic powder, for example, an organo silicon modified colloidal silica, and an inert filler such as sodium sulfate. The powder composition is injected into the turbulent stream by first mixing the powder with water to form a slurry and immediately thereafter drawing the slurry through an eductor into a recycle stream between the downstream and upstream ends of a pump for the turbulent stream.

A polymer emulsification process comprising intimately dispersing a liquified water insoluble polymer phase in an aqueous liquid medium phase containing at least, one nonionic, anionic or cationic oil-in-water functioning emulsifying agent, in the presence of a compound selected from the group consisting of those hydrocarbons and hydrocarbyl alcohols, ethers, alcohol esters, amines, halides and carboxylic acid esters which are inert, non-volatile, water insoluble, liquid and contain a terminal aliphatic hydrocarbyl group of at least about 8 carbon atoms, and mixtures thereof are described in U.S. Pat. No. 4,177,177. The resulting crude emulsion is subjected to the action of comminuting forces sufficient to enable the production of an aqueous emulsion containing polymer particles averaging less than about 0.5 microns in size.

U.S. Pat. No. 4,263,926 provides a method and apparatus for maintaining polymer particles in readily recoverable, discrete form, and for injecting the particles into a pipeline hydrocarbon by disposing particulate polymer within a storage hopper having a cone bottom and an auger extending upwardly from the bottom. The auger is rotated to cause the polymer particles to revolve in the hopper, reversing the rotation of the auger to pass polymer particles downwardly into a mixing chamber below the hopper. The particles pass through a rotary metering valve, or optionally, a bin activator, intermediate storage and rotary metering valve at the upper end of the chamber, simultaneously spraying a liquid such as oil or water tangentially in the chamber optionally agitating the chamber and removing a slurry of particulate polymer and liquid from the chamber and injecting the slurry into a pipeline hydrocarbon.

A technique for extremely rapid dissolution or dispersion on essentially the molecular level, of certain polymeric materials in compatible liquid vehicles is described in U.S. Pat. No. 4,340,076. The polymeric materials are comminuted at cryogenic temperatures and are then introduced into a liquid vehicle preferably while still at or near cryogenic temperatures. At low concentrations, the resulting blend or system displays reduced friction to flow while high concentrations may be used to immobilize the liquid vehicle and/or reduce its vapor pressure.

From reviewing the many foregoing prior patents it can be appreciated that considerable resources have been spent on both chemical and physical techniques for easily and effectively delivering drag reducing agents to the fluid that will have its drag or friction reduced. Yet none of these prior methods has proven entirely satisfactory. Thus, it would be desirable if a drag reducing agent could be developed which rapidly dissolves in the flowing hydrocarbon (or other fluid), which could minimize or eliminate the need for special equipment for preparation and incorporation into the hydrocarbon, and which could be formulated to contain greater than 10% polymer. It would also be desirable to have a process for producing particulate drag reducing agents that did not require cryogenic grinding in its preparation and/or only grinding under ambient temperature conditions.

Another important consideration in the production of polymeric drag reducing agents is the achieving of high conversions in the polymerization reaction, which are defined herein as generally on the order of at least 90%. High conversion makes the best use of the monomer and catalysts and achieves a high molecular weight polymer product. The high molecular weight polymer product helps mitigate subsequent degradation of the polymer product through size reduction, such as granulation or grinding, as well as through shear when the DRA product passes through pumps in the course of injecting it into a flowing hydrocarbon fluid or through a pipeline. Conventionally, high conversions and high molecular weights of DRA polyolefins are achieved by bulk or neat polymerizations conducted in batch reactions. However, it is well known in the art of polymerization science that the most efficient method of producing polymers en masse is through the methods of continuous polymerization processes. Thus, the preferred production processes of high volumes of DRA product are continuous processes. Some prior efforts at the continuous production of DRA product by employing bulk polymerization methods have been explored but have not proven entirely satisfactory either. One innovative approach is to conduct bulk polymerization at high conversion in a microcapsule described in U.S. Pat. Nos. 6,126,872 and 6,160,036, both of which are incorporated by reference herein.

It would thus be additionally advantageous if a continuous process existed for producing DRA polymer product at high conversions and molecular weight, yet in a form that was easily deliverable to a flowing hydrocarbon stream.

SUMMARY OF THE INVENTION

An object of the invention is to provide a process for producing a polymer drag reducing agent continuously at high conversion and high molecular weight.

Other objects of the invention include providing a polymer DRA of suitable small particle size and adequate surface area (for quick dissolution and dissipation in a flowing stream) that can be readily and continuously manufactured and that does not require cryogenic temperatures to be produced.

Another object of the invention is to continuously produce a polymer DRA at high conversion and high molecular weight that may be easily integrated into a process for producing a particulate or slurry DRA product.

In carrying out these and other objects of the invention, there is provided, in one form, a method for producing a polymer drag reducing agent that involves first mixing a monomer and a catalyst in at least one continuously stirred tank reactor (CSTR) to form a mixture. The mixture is then continuously injected into a volume that is continuously formed by a thermoplastic material. The thermoplastic material is periodically sealed off into a temporary container. Next, the monomer is permitted to polymerize under conditions of controlled temperature and inert atmosphere in the temporary container to form polymer. The resultant polymer and the temporary container are then ground, the latter typically removed by mechanical steps, to produce particulate polymer drag reducing agent. The particulate polymer drag reducing agent may then be combined with a dispersing fluid, such as to form a slurry or dispersion product.

DETAILED DESCRIPTION OF THE INVENTION

The invention involves the application of a continuous polymerization method in combination with non-cryogenic grinding or size reduction methods to produce polymeric drag reducing agents in a finely divided particulate form. More particularly, the continuous polymerization method involves a "form, fill and seal" packaging process, and the final formulation of dispersed polymer does not contain the traditional aqueous or glycolic, polar dispersing medium, but rather a mixture of hydrocarbons more compatible with and "friendly" to dissolution in pipeline components, e.g. a flowing hydrocarbon stream.

The polymerization apparatus may be composed of at least one or a series of continuous stirred tank reactors (CSTRs) where raw materials (e.g. monomers and catalysts) are continuously charged, allowed an appropriate dwell or residence time in the reactor system, such that an adequate molecular weight or viscosity is obtained, and subsequently discharged in a continuous fashion to a "form, fill and seal" packaging device.

It is the nature of the "form, fill and seal" apparatus to utilize a continuous sheet of thermo-formable or thermoplastic material to fabricate a container of some set or predetermined dimensions, perform the filling of said container by volumetric injection, and lastly seal the container such that a self-contained bag or temporary container of material (in this case, catalysts and activated monomer), is periodically or regularly captured in a continuous process.

In the "form, fill and seal" packaging device", the "living" polymer, having achieved a suitable viscosity and/or molecular weight in the CSTR, is discharged into continuously formed volumes formed by the thermoplastic material, in one non-limiting embodiment, continuously formed low density polyethylene bags, thermally sealed, and discharged to a collection point. The polyethylene bags, having been filled with the catalyst and activated monomer mixture within an inert atmosphere, now serve as temporary and isolated reactor vessels or polymerization sites. These temporary containers or reactor vessels are collected and kept again in the presence of an inert atmosphere, since the thermoplastic material is generally not designed to prevent the diffusion of contaminants such as oxygen, and allowed to polymerize to high conversion, e.g. at least 90% in one non-limiting embodiment. In another non-limiting embodiment of the invention, "high conversion" is considered to be at least 70%, dependent upon the amount of yield or rather the plasticized monomer one wishes to incorporate in an effort to affect the overall dissolution of polymer particles. The completed polymer is subsequently collected for grinding via ambient conditions.

The nature of the grinding process is such that a unique grinding aid renders a granulated polyolefin polymer into a ground state of fine particles of 600 microns or less at ambient conditions, in one non-limiting embodiment of the invention. This size reduction process may involve the use of an attrition mill, such as a Pallmann Pulverizer, in combination with a grinding aid or agent of suitable hardness in that shearing and surface blocking properties are imparted into the grinding chamber such that particle agglomeration and gel ball formation of soft polyolefins is prevented.

In one non-limiting embodiment, the grinding aid may be a microcrystalline component, such as a microcrystalline polymer or copolymer. These solid grinding aids may be products such as MICROTHENE® ethylene-co-butylene crystalline powders available from Equistar. It has been discovered that other, more traditional grinding aids such as calcium stearate or ethylene-bis-stearamide are too soft and inadequate in preventing agglomeration of polymer in the grinding chamber. It is important that the solid grinding aid impart the required shearing action in the grinding or pulverizing chamber in order to achieve the small polymer particles of 600 microns or less.

Another important portion of the invention is the formulation of the finely ground, polymer drag reducing agents into suitable dispersing fluids such that the agent may be delivered in accurate concentrations into a pipeline, and at the same time, avoid the traditional unstable dispersive mixtures of the past. The literature is filled with examples of slurries of drag reducing agents being composed of a variety of mixtures, more commonly those of water and glycol mixtures, which tend to invariably suffer from cold flow problems.

The present invention avoids cold flow problems by providing for a unique slurry or non-solvent mixture based on a combination of several hydrocarbon fluids in combination with one of those components having a melting point above two other fluids in the mixture. It has been found that the DRAs of this invention, once ground to 600 microns or smaller, may be dispersed in a hydrocarbon mixture composed, in one non-limiting embodiment of 25% polymer, 22.5% butyl cellosolve, 22.5% hexanol, and 40% mineral oil such as a Penreco petroleum (Penreco Ultima, melting point 130–135° F.; 54–57° C.). These components are added together above the melting point of the petroleum (in one non-limiting embodiment, 140° F.; 60° C.), and upon cooling, the stable mixture formed exists as a thick slurry that may be pumped quite freely with traditional methods and equipment. The petrolatum, once congealed, acts as a flow or stabilizing aid for the particulate system.

The invention will now be further discussed in more particular detail. Generally, the polymer that is processed in the method of this invention may be any conventional or well known polymeric drag reducing agent (DRA) including, but not necessarily limited to, poly(alpha-olefin), polychloroprene, vinyl acetate polymers and copolymers, poly(alkylene oxide) (PAO), and mixtures thereof and the like. In one embodiment of the invention, the monomer is any monomer which, when polymerized, forms a polymer suitable for use as a drag reducing agent (DRA). Such monomers are well known in the art and include, but are not necessarily limited to, alpha-olefins, such as 1-hexene, 1-octene, 1-decene, 1-dodecene, 1-tetra-decene, and the like; isobutylene; alkyl acrylates; alkylmethacrylates; alkyl styrene; and the like. Copolymers of these monomers may also make suitable drag reducing agents.

Polyalpha-olefins, which in one non-limiting embodiment are preferred herein, are polymerized from the monomers or comonomers by conventional techniques and will have molecular weights above 10 million. Polyalpha-olefins particularly suitable for the processes and compositions of this invention include the FLO® family of PAO DRAs, including FLO® 1004, FLO® 1005, FLO® 1008, FLO® 1010, FLO® 1012, FLO® 1020 and FLO® 1022 DRAs sold by Baker Pipeline Products, a division of Baker Petrolite Corporation. These DRAs are used for hydrocarbon streams.

The polymerization of certain monomers may be conducted by the inclusion of a catalyst into the monomer during or prior to inclusion of the monomer in at least one CSTR, in a non-limiting example. Any known suitable catalyst and/or co-catalyst may be used for the method of this invention as long as they sufficiently catalyze the reaction to a sufficient extent to meet the objectives of inventive method. Metallocenes are useful catalysts for polymerizing some monomers. In the case of alpha-olefins, polymerization may be conducted by the inclusion of a mixture of Ziegler-Natta catalyst and co-catalyst(s) into the monomer. Catalysts for the polymerization of alpha-olefins include, but are not necessarily limited to, powdered catalyst $TiCl_3AA$ (aluminum activated titanium trichloride); co-catalyst(s), diethylaluminum chloride (DEAC), and diethylaluminum ethoxide (DEALE); TEAL (triethyl aluminum chloride), tri-methyl aluminum, tri-isobutyl aluminum, MAO (methylaluminoxane) and the like. Of course, it will be necessary to match the co-catalyst with the main catalyst, so that the catalytic activity of the main catalyst is triggered only by the presence of a particular co-catalyst or class thereof. All components (monomer, catalyst, and co-catalyst (s)) required for the monomer to convert to high polymer can be brought together in various different ways that are not necessarily critical to the invention herein. In one non-limiting embodiment of the invention, it may be necessary or desirable to use a series of CSTRs prior to injection of the live or catalyst-activated polymer mixture into the volume surrounded by the continuously formed thermoplastic material.

Care must be taken to avoid poisons for particular catalysts or polymerizations. For example, if Ziegler-Natta catalysts are used to polymerize α-olefins, the presence of oxygen must be avoided since it deactivates both anionic and cationic catalyst systems. Water, in any quantities other than minute molecular quantities, is also a poison. As previously mentioned, the use of low density polyethylene as the thermoplastic material that is continuously formed to provide the bags or containers for the monomer/catalyst mixture does not prevent the diffusion of gaseous contaminants such as oxygen through the material to poison the catalyst. Thus, the temporary containers package (also referred to as bags, pouches, tubes, etc.) should be placed into an inert environment, such as a box, vault or room containing an inert gas or fluid. Other suitable thermoformable materials besides low density PE include, but are not necessarily limited to, polypropylene, polyvinylidene chloride, polyvinyl chloride, and combinations thereof.

In one non-limiting embodiment of the invention, the temporary containers are placed in a tank or reservoir that has an inert gas or a circulating liquid bath where the liquid is inert to the bag barrier film and also assists in channeling the heat resulting from the polymerization away from the temporary containers to thereby assist in the high conversion of the monomer. Suitable heat transfer fluids include, but are not necessarily limited to, glycols such as ethylene glycol, propylene glycol, etc.; mixtures of glycols with water; ISOPART™ L isoparaffin available from ExxonMobil Chemical, kerosene, and the like. In one non-limiting embodiment of the invention, the temporary containers are placed in a larger, refrigerated box or container or "reefer" where the refrigeration also assists in removing the heat of polymerization from the reaction.

Certain monomers may be polymerized by the use of UV radiation to initiate reaction in place of or in addition to the use of catalysts and/or co-catalysts. In such a system, the thermoplastic material would have to be transparent to the frequency of the radiation necessary to initiate or encourage polymerization of the monomer in the temporary container.

A particular advantage of the technique of this invention is that the polymerization may be conducted entirely within the bag or temporary container under relatively small-scale bulk polymerization conditions in the absence of a solvent, or in the presence of only a relatively small amount of solvent. Conventionally, production of the very high molecular weight polymers useful as DRAs necessarily is done at high dilutions in a suitable solvent. Removal of large amounts of solvent thus becomes an issue, since transportation of large amounts of ineffective solvent to the site of drag reduction is an unnecessary expense. However, in the inventive continuous process, very little or no solvent is required, and the polymerization reaction may be conducted within the temporary container by conventional techniques. Very high molecular weight DRAs may be produced, for example on the order of 10 million weight average molecular weight or more. If solvent is used, the solvent proportion is at most only about 0.5 weight percent of the total mixture of monomer and catalyst, preferably at most only about 1.0%. Suitable solvents for the polymerization of alpha-olefins include, but are not necessarily limited to, kerosene, paraffinic Isopar solvents, isopentane, and the like.

The sealing of the thermoplastic material around the mixture of monomer and catalyst to form the temporary containers (small scale bulk reactors) would generally occur periodically and regularly since the process is continuous and the form, fill and seal apparatus is automatic. However, it is not necessary that the temporary containers be uniform in size and shape. As might be expected, the temporary containers will be generally tubular in shape and have a circular cross-section, however, this shape is generally a function of the commercially available form, fill and seal machinery and is not critical to the practice of the invention. The length of the temporary containers may be practically limited by the dimensions of the vault, reservoir, bath or reefer where they reside while the monomer is permitted to complete reaction to form the polymer.

Sealing the thermoplastic material is more directly dictated by whether the monomer mixture has reached a predetermined viscosity so as to permit effective cutting off of the mixture and sealing into the bags or temporary containers. This viscosity should be sufficiently high to permit the form, fill and seal machinery to operate without troublesome leaks or excess mixture fouling the equipment or process. In one non-limiting embodiment of the invention the viscosity of the mixture should reach at least 100 cP, and preferably at least 500 cP.

Alternatively, or in addition to the viscosity threshold discussed above, it may be necessary or desirable for the still-reacting polymer ("living" polymer) to reach a certain minimum molecular weight before it is desirable to seal the temporary containers or bags and transfer the containers or bags to an inert environment for continued reaction to completion. The predetermined or desired molecular weight is more likely to vary with the particular polymer involved, as contrasted with viscosity, which may be an acceptable threshold for a variety of polymers. In one non-limiting embodiment for polyalpha-olefins, one molecular weight threshold to be reached may be about 1000 weight average molecular weight, preferably about 5000.

For the method of this invention, the polymeric DRA is preferably of sufficient structure (molecular weight) to exist as a neat solid which would lend itself to the pulverizing process, i.e. that of being sheared by mechanical forces to smaller particles. A DRA of a harder, solid nature (relatively higher glass transition temperature) than poly(alpha-olefin) would certainly work. A DRA of a relatively softer nature (lower glass transition temperature, more rubbery polymer) would be more difficult to pulverize by processes to be described. A DRA that exists as dissolved in solution (gel polymers) would have no applicability here, of course.

A process has been discovered by which attrition mill pulverizing technology can be utilized in combination with unique grinding aids to render a granulated polyolefin polymer into a ground state of fine particles of 600 microns or less at non-cryogenic conditions. The process preferably involves the introduction of organic solid grinding aid into the grinding chamber such that particle agglomeration and gel ball formation of soft polyolefins is minimized or prevented. The solid grinding aid is also required to provide the shearing action necessary in the grinding or pulverizing chamber to achieve the small polymer particles of about 600 microns or less.

In one non-limiting embodiment of this invention, the grinding for producing particulate polymer drag reducing agent is conducted at non-cryogenic temperatures. For the purposes of this invention, cryogenic temperature is defined as the glass transition temperature ($T_g$) of the particular polymer having its size reduced or being ground, or below that temperature. It will be appreciated that $T_g$ will vary with the specific polymer being ground. Typically, $T_g$ ranges between about –10° C. and about –100° C. (about 14° F. and about –148° F.), in one non-limiting embodiment. In another non-limiting embodiment of the invention, the grinding for producing particulate polymer drag reducing agent is conducted at ambient temperature. For the purposes of this invention, ambient temperature conditions are defined as between about 20–25° C. (about 68–77° F.). In another non-limiting embodiment of the invention, ambient temperature is defined as the temperature at which grinding occurs without any added cooling. Because heat is generated in the grinding process, "ambient temperature" may in some contexts mean a temperature greater than about 20–25° C. (about 68–77° F.)—a typical range for the term "ambient temperature". In still another non-limiting embodiment of the invention, the grinding to produce particulate polymer drag reducing agent is conducted at a chilled temperature that is less than ambient temperature, but that is greater than cryogenic temperature for the specific polymer being ground. A preferred chilled temperature may range from about –7 to about 2° C. (about 20 to about 35° F.).

Poly(alpha-olefin) is a preferred polymer in one non-limiting embodiment of the invention. As noted, poly(alpha-olefins) (PAOs) are useful to reduce drag and friction losses in flowing hydrocarbon pipelines and conduits. In one not limiting embodiment of the invention, the polymer, together with the thermoplastic material on the boundary of the temporary container may have its size reduced in one step, or may have its size reduced in multiple steps or stages. For instance, the polymer may be granulated, that is, broken up or otherwise fragmented into granules in the range of about 6 mm to about 20 mm, preferably from about 8 mm to about 12 mm. It is permissible for the granulated polymer to have an anti-agglomeration agent thereon. Such agglomeration agents include, but are not necessarily limited to talc, alumina, calcium stearate, ethylene bis-stearamide and mixtures thereof.

Within the context of this invention, the term "granulate" refers to any size reduction process that produces a product that is relatively larger than that produced by grinding. Further within the context of this invention, "grinding" refers to a size reduction process that gives a product relatively smaller than that produced by "granulation". "Grinding" may refer to any milling, pulverization, attrition, or other size reduction that results in particulate polymer drag reducing agents of the size and type that are the goal of the invention.

While grinding mills, particularly attrition mills such as Pallmann attrition mills, Munson centrifugal impact mills, Palmer mechanical reclamation mills, etc. may be used in various non-limiting embodiments of the invention, other grinding machines may be used in the method of this invention as long as the stated goals are achieved.

The solid organic grinding aid may be any finely divided particulate or powder that inhibits, discourages or prevents particle agglomeration and/or gel ball formation during grinding. The solid organic grinding aid may also function to provide the shearing action necessary in the pulverizing or grinding step to achieve polymer particles of the desired size. The solid organic grinding aid itself has a particle size, which in one non-limiting embodiment of the invention ranges from about 1 to about 50 microns, preferably from about 10 to about 50 microns. Suitable solid organic grinding aids include, but are not necessarily limited to, ethene/ butene copolymer (such as MICROTHENE®, available from Equistar, Houston), paraffin waxes (such as those produced by Baker Petrolite), solid, high molecular weight alcohols (such as Unilin alcohols (C12–C60) available from Baker Petrolite ), and any non-metallic, solid compounds composed of C and H, and optionally N and/or S which can be prepared in particle sizes of 10–50 microns suitable for this process, and mixtures thereof. As previously mentioned, some traditional grinding aids such as talc, calcium stearate, ethylene-bis-stearamide were discovered to be ineffective as solid, organic grinding aids. In one particular, non-limiting embodiment, the solid organic grinding aid of this invention has an absence of fatty acid waxes.

It will be appreciated that there will be a number of different specific ways in which the invention may be practiced that are within the scope of the invention, but that are not specifically described herein. For instance, in one non-limiting embodiment of the invention, a granulated polymer is fed into the grinding chamber at a rate of from about 100 to about 300 lbs/hr (45–136 kg/hr) and the solid organic grinding aid is fed at a rate of from about 10 to about 90 lb/hr (4.5–41 kg/hr). Preferably, a granulated polymer is fed into the grinding chamber at a rate of from about 200 to about 300 lb/hr (91–136 kg/hr) and the solid organic grinding aid is fed at a rate of from about 10 to about 30 lb/hr (4.5–41 kg/hr). As noted, all of the components may be fed simultaneously to the grinding chamber. Alternatively, the components may be mixed together prior to being fed to the grinding chamber. In another non-limiting embodiment of the invention, the components are added sequentially, in no particular order or sequence. Grinding speeds of 3600 rpm utilized in a Pallmann PKM model and 5000 rpm utilized in a Universal mill were found to be acceptable in specific, non-limiting embodiments of the invention.

In one non-limiting embodiment of the invention, it is expected that the processes described herein will produce particulate polymer drag reducing agent product where the average particle size is less than about 600 microns, preferably where at least 90 wt % of the particles have a size of less than about 600 microns or less, 100 wt. percent of the particles have a size of 500 microns or less, and most preferably 61.2 wt. % of the particles have a size of 297 microns or less in non-limiting embodiments. One achievable distribution is shown in Table I utilizing a PKM-600 model grinder; a series of other particle distributions vs. the screen size is displayed in Table II with the Universal Mill.

TABLE I

| Micron Retained | Screen Mesh Size | Percent |
|---|---|---|
| 500 | 35 | 38.8 g |
| 297 | 50 | 55.7 g |
| 210 | 70 | 4.1 g |
| 178 | 80 | 0.4 g |
| 150 | 100 | 0.4 g |
| pan | pan | 0.6 g |

TABLE II

| Particle Size (microns) | 35 Mesh Screen | 30 Mesh Screen | 20 Mesh Screen |
|---|---|---|---|
| 800 | 5 | 2 | 2 |
| 700 | | | |
| 600 | | | 17 |
| 500 | 4 | 11 | 18 |
| 400 | 35 | 27 | 20 |
| 200 | 35 | 32 | 24 |
| 100 | 14/7 | 16/12 | 11/8 |

In one non-limiting embodiment of the invention, during the grinding stage (and/or the granulation stage, if any) any excess solid grinding aid and at least a portion of the temporary container are removed from the grinding (and/or granulation) process. This removal may be conducted by any suitable conventional or future process including, but not necessarily limited to, vacuum, cyclone, centrifugation, etc.

One useful device that has been utilized to remove bag material is the "multi-aspirator" produced by Kice Industries. A successful separations trial of granulated polymer (C6/C12 bulk polymer) and PE sheeting was performed at Kice Industries in Wichita, KS. The trial was conducted on a model 6F6 "multi-aspirator" unit utilizing consecutive increased air volumes, combined with a static de-ionizing bar, to essentially remove all of the free PE sheet mixed with the granulated polymer. Once ideal conditions were determined for separation, a drum of the granulated was run through the "multi-aspirator" for further testing.

If a suitable thermoplastic or thermo-formable material is selected for the form, fill and seal process, then it is permissible or acceptable for small quantities of this material to be retained with the polymer product. In one non-limiting embodiment of the invention, approximately 0.05 wt. % or less of the thermoplastic material, and approximately 35 wt. % or less of the grinding aid may be permitted in the resultant particulate polymer drag reducing agent. However, residual bag material is typically filtered out by Sweko filtration prior to material going to the field.

In one preferred embodiment of the invention, the finely ground, drag reducing agents are dispersed in a suitable fluid as previously mentioned. The dispersing fluid is preferably a mixture of at least two hydrocarbon fluids, where a first fluid has a melting point above the melting point of a second fluid. In another preferred embodiment of the invention, the dispersing fluid includes at least three hydrocarbon fluids, where one of the fluids has a melting point above the melting points of the other two fluids.

In the case where two components are used in the dispersing fluid, the first fluid may range from about 30 wt % to about 35 wt % of the total dispersing fluid, and the second fluid may range from about 40 wt % to about 45 wt % of the total dispersing fluid. In the case where the dispersing fluid is composed of at least three components, the first fluid may range from about 30 wt % to about 35 wt % of the total dispersing fluid, and the combined proportion of the other two component fluids (or multiple components) may range from about 40 wt % to about 45 wt % of the total dispersing fluid.

In one non-limiting embodiment of the invention, from about 25 to about 30 weight % of the total slurry is the polymer DRA of the invention, preferably from about 28 to about 32 weight % of the total slurry.

It is critical when dispersing the polymer into a fluid mixture containing an ambient solid petroleum compound, that the fluid mixture be heated above the melting point of the petroleum oil. Once mixed and allowed to cool, moderate agitation is utilized to render a flowable mixture. (There is no particular or critical method or technique for incorporating the ground DRA polymer into the dispersing fluid, as long as the slurry is mixed or combined to be uniform.) A surprising feature of the dispersing fluid aspect of the invention is that no additional emulsifiers, dispersants, surfactants and/or thickening agents are required to keep the particulate polymer DRA stable in the slurry, as is often the case with prior DRA slurries.

It is expected that the resulting particulate polymer DRAs can be easily transported without the need for including appreciable amounts of an inert solvent, and that the particulate polymer DRAs can be readily inserted into and incorporated within a flowing hydrocarbon, and possibly some oil-in-water emulsions or water-in-oil emulsions, as appropriate. DRA products made by the process of this invention flow readily under moderate pressure or pumping and contain a relatively high percentage, from about 70–80% of active polymer. Furthermore, there is an absence of any need to add an additional anti-agglomeration aid or partitioning agent to the DRA after it is ground to its desirable size. After the polymer is ground, a concentrated mixture of 70–80% polymer mixed with grinding aid results. Once the polymer is placed in the dispersing fluids, the amount of polymer averages about 25–30% in the dispersive mixture.

The invention will now be further described with respect to specific examples that are provided only to further illustrate the invention and not limit it in any way.

EXAMPLE 1

Polymerization

An upgraded pilot operation for the production of neat or bulk polymer using a 30-liter Buss reactor included three areas of activity. They encompass at least (a) a polymerization operation comprised of a half gallon (1.9 liter) CSTR vessel, the accompanying Buss reactor and associated monomer/catalysts pumps, and sieve bed systems, (b) a packaging operation, i.e. a "form, fill, and seal" packaging machine with an enclosure as assembled by J&J Manufacturing, and (c) a recovery operation whereby 16-inch long (41-cm) polyethylene bags filled with activated monomer were to be captured and placed in a nitrogen purged, refrigerated area for further polymerization.

Thus, the polymerization apparatus was composed of two CSTRs (continuous stirred tank reactors) whereby raw materials (monomers and catalysts) were continuously charged, allowed an appropriate dwell or residence time in the reactor system such that an adequate molecular weight or viscosity is obtained, and subsequently discharged in continuous fashion to the form, fill, and seal packaging apparatus. In the packaging apparatus, the "living" polymer (having achieved a suitable viscosity) is discharged into low density polyethylene bags, the bags being continuously formed by thermoplastic techniques and thereafter, charged with activated polymer mixture (flowing from the CSTR), thermally sealed, and discharged to a collection point. The polyethylene bags, having been filled with catalyst, activated monomer mixture and now serving as isolated reactor vessels or polymerization sites, are collected, kept in the presence of an inert atmosphere (since the bags are not designed to prevent the diffusion of contaminants such as oxygen), allowed to polymerize to high conversion (approximately 90%), and the polymer subsequently collected for grinding.

As stated above, both monomers and catalysts were charged to the initial CSTR, where adequate mixing took place, prior to the fluids entering the Buss reactor for enhanced residence or polymerization time with constant agitation. During time in the Buss reactor, suitable viscosity was reached such that catalyst particles were actually suspended in the polymerizing mixture. Within 10–15 minutes of mixing in the Buss reactor, the slightly viscous polymer mixture was pumped in continuous fashion into the charge line leading to the collection hopper atop the "form, fill, seal" apparatus. Thus, the hopper served as the final reservoir as the product was fed into the volumetric charge system on the packaging device, in essence, charging 1 lb (0.45 kg) of product into a polyethylene formed bag every 30 seconds. In subsequent fashion, the filled bags were collected and placed in two (nitrogen purged) refrigeration boxes and left to polymerize for 24 hours. During the time in the polymerization box, the polymer reached an estimated 55–65% solids. Upon retrieval from the cold boxes, the polymer bags containing neat polymer were quickly transferred to drums, blown down with nitrogen and transported to a refrigerated trailer where polymerization continued over a 4–6 day period. Conversions on the order of 90% were reached in this time (which is also a function of catalyst concentration and temperature).

Form, Fill, and Seal (FFS) Packaging

The "form, fill, and seal" packaging device as assembled by J&J Manufacturing, was not traditionally utilized for Class I, Division I environments. Thus, the machine was modified with an enclosure in which positive nitrogen pressure could be maintained in order to meet the NFPA 496 standard for purged and pressurized enclosures for electrical equipment. The enclosure was retro-fitted with a purge panel in order to maintain positive nitrogen pressure for safe operation of the packaging machine. Doorways to the enclosure were also fitted with devices to detect opening of the doors such that power could be immediately shut down. As a secondary and independent sensing device, an oxygen sensor was also installed in the enclosure that allowed one to manually monitor the oxygen levels in the box. An alarm module was thus set to trip when oxygen levels are too high, also cutting off power to the packaging device. Ziegler-Natta polymerization of polyolefins can be quite oxygen sensitive, thus the maintenance of a pristine environment with respect to the lack of oxygen can be vital for success as well as safety.

In order to maintain cooling across the reactor and FFS device, the charge line from the Buss reactor to the hopper sitting atop the packaging machine was insulated with polyurethane insulation. The hopper was also modified with a cooling jacket and plumbed into the glycol/water coolant line. During bagging operations, the hopper temperature was held at 12° C. A nitrogen purge was also connected to the hopper along with a 3-way valve on the charge line such that reactor flows could be diverted to a collection area if necessary. The same pathway can be utilized to wash the reactor charge line system with Isopar C for cleaning purposes at the end of a production run.

During normal operations of the packaging machine, polyethylene (PE) sheeting (7 inches (18 cm) wide) was pulled down over a cylindrical forming collar and the PE heat sealed into a 3 inch (7.6 cm) diameter tube. The sealing temperatures on the various surfaces averaged 295° F. (146° C.). Once the bottom and rib of the 16 inch (41 cm) long PE bag were thermally sealed, the filling operation took place such that 1 pound (45 g) of activated monomer was delivered to the bag. The filled bag was then advanced downwards and jaws will cut and thermally sealed the upper portion of the bag. The bag subsequently dropped down into the catch or holding tube to await another filling cycle. The two gate valves arranged on the drop tube system were aligned with signals associated with the filling device and the jaw closing sequence, thus the same opening/closing sequence allowed the capture, holding, and eventual depositing of the bag out of the bottom of enclosure, and at the same time, maintained integrity of the positive nitrogen pressure. The packaging apparatus deposited 2 bags per minute or 2 lbs (908 g) of polymer per minute, which equaled the proposed continuous 120 lb (54 kg) an hour charge rate into the Buss reactor.

Bag Recovery/Polymerization Box/Reefer Storage

Monomer filled bags were captured from below the packaging apparatus at the rate of 2 bags per minute. Bags were collected for several minutes in a cold ice chest vented with nitrogen prior to making the manual trip to the refrigeration box for further polymerization. The polymerization box was fitted with rubber glove inserts, drop tube assemblies, as well as an array of baskets (60 per box) and a rack system to facilitate the placement and storage of bags. Catch pans were also situated in the bottom of the boxes to catch any leaking polymer. One of the unique features discovered about the neat or bulk FLO polymer is that leaks tended to be self-sealing. Thus, as the polymerization proceeds in the static environment of the bag, the viscosity increases and actually seals off the area of leakage. Polymerization boxes were also purged with nitrogen and the temperature was set at 22° F. (−5.6° C.).

Bags were held in the cold polymerization boxes for at least 24 hours as polymer conversion approached 55–65%. At such time the bags of polymer were quickly unloaded from the boxes into drums fitted with nitrogen sparing systems. After nitrogen sparing of the drums, they were capped and again moved quickly to the refrigerated trailer near the generator system. The product spent approximately 4–6 days achieving conversions of 85–90% in the 35–40° F. (1.7–4.4° C.) Environment. Once polymerization was complete, the PE was removed from the polymer in manual fashion and the polymer moved to the granulating unit for size reduction.

EXAMPLE 2 Reaction 1644-137

Prior to the installation of the form, fill, seal device, experiment 1644-137 was run to demonstrate the feasibility/applicability of continuously charging the reactor system with monomer and catalyst. Thus, the material of this Example was transferred over to a refrigeration box into lay-flat tubing in order to allow for a complete polymerization or conversion to high polymer solids. Lay-flat tubing in this case is described as a continuous length of low density polyethylene tubing (4 mils thick) situated in the refrigeration box, connected to the Buss reactor via charge line, and blown down with nitrogen to provide an inert atmosphere. Thus, the Buss reactor was run for several hours at an alpha-olefin monomer charge rate of 90 lbs./hour (41 kg/hr), with the polymer outflow being transferred into the lay-flat tubing upon each reactor filling cycle. This particular reaction was run at what was thought to be a relatively high catalyst level and surprisingly high drag reduction values were obtained after 24 hours of reaction time. Upon capturing the polymer after the 24-hour reaction cycle, the material was stored under nitrogen in the refrigeration trailer at 35–37 F (1.7–2.8° C.). The final % drag or % solids at final conversion was not determined. In one non-limiting embodiment of the invention, one goal is to achieve % drag reduction in the range of 60–55% at 0.25 ppm active polymer in the hydrocarbon stream being treated. Results are shown in Table III.

TABLE III

Solids and Drag Reduction Achieved for Reaction Example 2

| Example 2 | Core Sample Solids | Outer Sample Solids | Core % Drag/Outer Drag at 0.25 PPM | Reaction Time/Temp. |
|---|---|---|---|---|
| Lay-flat Tubing #1 | 57.9% | 52.3% | 52.8/48.3 | 24 hr at 18–25° F. (−7.8—−3.9° C.) |
| Lay-flat Tubing #2 | 63.8% | 48.1% | 59.2/56.4 | 24 hr at 18–25° F. (−7.8—−3.9° C.) |

Subsequent to the Examples discussed above, it was discovered that holding the bags or temporary containers of polymerizing polymer in cold polymerization boxes was manually intensive and did not provide the ideal heat transfer for the reaction. Thus, permitting the monomer to polymerize in the temporary containers or bags in an inert liquid and/or inert environment where the liquid was circulated greatly improved heat transfer and assisted in optimizing the polymerization reaction. Storing the temporary containers in Isopar L or a propylene glycol/water (PG) mixture was found suitable. The ratio of propylene glycot/water in the PG mixture was 60 wt % to about 40 wt %, although it will be appreciated that other ratios and other glycols may also find use as suitable circulating and heat transfer fluids.

Further details about grinding and size reduction of the polymer produced in the method of this invention to give a particulate polymer DRA prior to introduction into a hydrocarbon fluid may be found in U.S. patent application Ser. No. 10/322,050, filed herewith, incorporated by reference herein.

EXAMPLE 3 Reaction 1644-163

A successful "continuous bulk polymerization/bagging/capture" experiment was performed using similar conditions as in Example 2, however, in this case the polymer outflow was transferred directly to the form, fill, seal apparatus where continuous bagging took place. It was again realized early in the run that initial catalyst levels were too high. These catalysts levels were eventually reduced from a high to low range over the one and one half hour course of the reaction/bagging exercise. Altogether, over 150 lbs (68 kg) of bagged polymer was collected. Instead of storing the captured bags in a under nitrogen in a refrigeration trailer, these bags were stored in drums of cold fluid such as kerosene and Isopar L. Nitrogen was bubbled through the drums of fluid to achieve adequate mixing and heat dispersion. Conversions and drag efficiencies were measured after 48 hours and found to be 76% solids and 57% drag at 0.25 ppm polymer concentration.

EXAMPLE 4 Reaction 1644-181

Successful "continuous bulk polymerization/bagging/capture" experiments were also conducted with increased monomer rates. In this particular example, a total monomer composition rate of 200 lbs (91 kg) an hour coupled with an appropriate catalyst/co-catalyst concentration was utilized during the two hour experiment. Thus, the outflow from the Buss reactor was discharged to the form, fill, seal, device where the bagging rate was adjusted to four bags per minute. Bags collected were stored in a basket fitted to 330 gallon (1.2 $m^3$) totes filled with cold kerosene (26° F.; −3° C.); the totes were bubbled with nitrogen to improve heat transfer.

The basket containing the bagged polymer was removed from the kerosene tote after 24 hours and transferred to a second tote in a refrigerated trailer. This second tote contained propylene glycol held at 38° F. (30° C.). The polymer was allowed to continue the conversion process for several days submerged in the propylene glycol whereupon conversion was measured as 76% solids and the drag efficiency measured as 53% at 0.25 ppm polymer concentration.

EXAMPLE 5

A 250 gallon (0.95 $m^3$) stainless steel tote was fitted with side heating elements such that the tote and contents could be heated to at least 140° F. (60° C.). The tote was subsequently charged with 180 lbs (82 kg) hexanol and 180 lbs (82 kg) of butyl cellosolve. While the tote heated overnight, a drum of Penreco Ultima (melting point 130–135° F., 54–57° C.) was rendered into its molten state with an overnight stay in the appropriate hot-box. Once the tote and its contents reached 140° F. (60° C.), the Penreco Ultima was retrieved from the hot-box and quickly added to the tote with stirring from a lightening mixer and re-circulation utilizing an air pump. Immediately upon mixing the mixture was allowed to cool with continued moderate mixing. The resulting composition was a pasty slurry having a viscosity of 300–400 cP.

Many modifications may be made in the composition and process of this invention without departing from the spirit and scope thereof that are defined only in the appended claims. For example, the exact nature of and proportions of monomer and catalyst, solid organic grinding aid, the rate of production, the details of the form, fill and seal apparatus and method, the grinding process, the exact composition of the dispersing fluid etc. may be different from those used here. Particular processing techniques may be developed to enable the components to be homogeneously blended and work together well, yet still be within the scope of the invention. Additionally, feed rates of the various components are expected to be optimized for each type of CSTR; form, fill and seal apparatus; grinding equipment and for each combination of particular components employed.

We claim:

1. A method for producing a polymer drag reducing agent, comprising:

mixing a monomer and a catalyst in at least one continuously stirred tank reactor (CSTR) to form a mixture;

continuously injecting the mixture into a volume continuously formed by a thermoplastic material;

periodically sealing off the thermoplastic material into a temporary container;

permitting the monomer to polymerize in the temporary container to form polymer; and grinding the polymer and the temporary container to produce particulate polymer drag reducing agent.

2. The method of claim 1 where in the continuous injecting, the thermoplastic material is low density polyethylene.

3. The method of claim 1 where in the periodic sealing off of the thermoplastic material, the point at which the sealing occurs to form the temporary container is selected from the group consisting of (1) the mixture reaching a predetermined viscosity, (2) the polymer reaching a predetermined molecular weight, and (3) a combination of (1) and (2).

4. The method of claim 1 where in permitting the monomer to polymerize in the temporary container, the containers are placed in an inert environment.

5. The method of claim 4 where in the permitting the monomer to polymerize in the temporary container, the inert environment is a bath of circulated fluid that removes heat of polymerization from the polymer.

6. The method of claim 1 where in grinding the polymer and the temporary container, the grinding is conducted at a temperature above the glass transition temperature of the polymer.

7. The method of claim 1 where in grinding the polymer and the temporary container, the grinding is conducted in the presence of a grinding aid.

8. The method of claim 7 where in grinding the polymer and the temporary container, the grinding aid is a solid organic grinding aid having a size between about 1 and about 50 microns.

9. The method of claim 7 where in grinding the polymer and the temporary container, the grinding aid is selected from the group consisting of ethene/butene copolymer, paraffin waxes, solid alcohols, and mixtures thereof.

10. The method of claim 7 where in grinding the polymer and the temporary container, a portion of the ground temporary container and a portion of excess grinding aid, if any, are removed from the ground polymer.

11. The method of claim 1 further comprising combining the particulate polymer drag reducing agent with a dispersing fluid to form a slurry product.

12. The method of claim 11 where in combining the particulate polymer drag reducing agent with a dispersing fluid, the dispersing fluid is a mixture of at least two hydrocarbon fluids comprising a first fluid having a melting point above a melting point of a second fluid.

13. The method of claim 12 where in the dispersing fluid, the first fluid ranges from about 30 wt % to about 35 wt % and the second fluid ranges from about 40 wt % to about 45 wt % based on the total volume of the dispersing fluid.

14. The method of claim 12 where the first fluid is petroleum.

15. The method of claim 1 where in mixing the monomer and the catalyst, the monomer is an alpha-olefin.

16. The method of claim 1 where in the grinding, the particulate polymer drag reducing agent has an average particle size of equal to or less than about 600 microns.

17. The method of claim 1 where in the grinding, the grinding is conducted in the absence of cryogenic temperatures.

18. The method of claim 1 where in the grinding, the grinding is conducted at ambient temperatures.

19. A method for producing a polymer drag reducing agent, comprising:

mixing a monomer and a catalyst in at least one continuously stirred tank reactor (CSTR) to form a mixture;

continuously injecting the mixture into a volume continuously formed by a thermoplastic material;

periodically sealing off the thermoplastic material into a temporary container;

permitting the monomer to polymerize in the temporary container in an inert environment to form polymer; and grinding the polymer and the temporary container at a temperature above the glass transition temperature of the polymer to produce particulate polymer drag reducing agent.

20. The method of claim 19 where in the continuous injecting, the thermoplastic material is low density polyethylene.

21. The method of claim 19 where in the periodic sealing off of the thermoplastic material, the point at which the sealing occurs to form the temporary container is selected from the group consisting of (1) the mixture reaching a predetermined viscosity, (2) the polymer reaching a predetermined molecular weight, and (3) a combination of (1) and (2).

22. The method of claim 19 where in the permitting the monomer to polymerize in the temporary container, the inert environment is a bath of circulated fluid that removes heat of polymerization from the polymer.

23. The method of claim 19 where in grinding the polymer and the temporary container, the grinding is conducted in the presence of a grinding aid.

24. The method of claim 23 where in grinding the polymer and the temporary container, the grinding aid is selected from the group consisting of ethene/butene copolymer, paraffin waxes, solid alcohols, and mixtures thereof.

25. The method of claim 23 where in grinding the polymer and the temporary container, a portion of the ground temporary container and a portion of excess grinding aid, if any, are removed from the ground polymer.

26. The method of claim 19 further comprising combining the particulate polymer drag reducing agent with a dispersing fluid to form a slurry product.

27. The method of claim 26 where in combining the particulate polymer drag reducing agent with a dispersing fluid, the dispersing fluid is a mixture of at least two hydrocarbon fluids comprising a first fluid having a melting point above a melting point of a second fluid.

28. The method of claim 27 where in the dispersing fluid, the first fluid ranges from about 30 wt % to about 35 wt % and the second fluid ranges from about 40 wt % to about 45 wt % based on the total volume of the dispersing fluid.

29. The method of claim 19 where in the grinding, the particulate polymer drag reducing agent has an average particle size of equal to or less than about 600 microns.

30. The method of claim 19 where in the grinding, the grinding is conducted in the absence of cryogenic temperatures.

31. The method of claim 19 where in the grinding, the grinding is conducted at ambient temperatures.

32. A slurry of particulate polymer drag reducing agent comprising:

a particulate polymer drag reducing agent; and a dispersing fluid, where the dispersing fluid comprises:
a first hydrocarbon fluid; and a second hydrocarbon fluid, where the first hydrocarbon fluid has a melting point above the melting point of second hydrocarbon fluid.

33. The slurry of claim 32 where in the dispersing fluid, the first fluid ranges from about 30 wt % to about 35 wt % and the second fluid ranges from about 40 wt % to about 45 wt % based on the total volume of the dispersing fluid.

34. The slurry of claim 32 where the first fluid is petroleum.

35. The slurry of claim 32 where the particulate polymer drag reducing agent is polyalpha-olefin.

36. The slurry of claim 32 where the particulate polymer drag reducing agent has an average particle size of equal to or less than about 600 microns.

37. The slurry of claim 32 further comprising a grinding aid.

38. The slurry of claim 37 where the grinding aid is a solid organic grinding aid having a size between about 1 and about 50 microns.

39. The slurry of claim 37 where the grinding aid is selected from the group consisting of ethene/butene copolymer, paraffin waxes, solid alcohols, and mixtures thereof.

40. A slurry of particulate polymer drag reducing agent comprising:

a particulate polyalpha-olefin drag reducing agent having an average particle size of equal to or less than about 600 microns; and a dispersing fluid, where the dispersing fluid comprises:
a first hydrocarbon fluid; and a second hydrocarbon fluid, where the first hydrocarbon fluid has a melting point above the melting point of second hydrocarbon fluid.

41. The slurry of claim 40 where in the dispersing fluid, the first fluid ranges from about 30 wt % to about 35 wt % and the second fluid ranges from about 40 wt % to about 45 wt % based on the total volume of the dispersing fluid.

42. The slurry of claim 40 where the first fluid is petroleum.

43. The slurry of claim 40 further comprising a grinding aid.

44. The slurry of claim 43 where the grinding aid is a solid organic grinding aid having a size between about 1 and about 50 microns.

45. The slurry of claim 43 where the grinding aid is selected from the group consisting of ethene/butene copolymer, paraffin waxes, solid alcohols, and mixtures thereof.

* * * * *

UNITED STATES PATENT AND TRADEMARK OFFICE
CERTIFICATE OF CORRECTION

PATENT NO.    : 6,649,670 B1
DATED         : November 18, 2003
INVENTOR(S)   : Jeffery R. Harris et al.

It is certified that error appears in the above-identified patent and that said Letters Patent is hereby corrected as shown below:

Column 1,
Line 37, please delete "particulate." and insert therefor -- particulate --.

Column 2,
Line 23, please delete "the." and insert therefor -- the --.
Line 44, please delete "least," and insert therefor -- least --.

Column 5,
Lines 54 and 56, please delete "petroleum" and insert therefor -- petrolatum --.

Column 7,
Line 9, please delete "ISOPART$^{TM}$" and insert therefor -- ISOPAR$^{TM}$ --.

Column 17,
Line 2, please delete "petroleum" and insert therefor -- petrolatum --.

Column 18,
Lines 22-23, please delete "petroleum" and insert therefor -- petrolatum --.
Lines 52-53, please delete "petroleum" and insert therefor -- petrolatum --.

Signed and Sealed this

Thirteenth Day of January, 2004

JON W. DUDAS
*Acting Director of the United States Patent and Trademark Office*